O. O. WALBERT.
SHAFT COUPLING.
APPLICATION FILED OCT. 3, 1919.

1,371,828.

Patented Mar. 15, 1921.

Inventor
Ora O. Walbert.
by Chas. J. Williamson
Atty

UNITED STATES PATENT OFFICE.

ORA O. WALBERT, OF BATESVILLE, ARKANSAS.

SHAFT-COUPLING.

1,371,828.                    Specification of Letters Patent.        Patented Mar. 15, 1921.

Application filed October 3, 1919. Serial No. 328,159.

*To all whom it may concern:*

Be it known that I, ORA O. WALBERT, a citizen of the United States, residing at Batesville, in the county of Independence and State of Arkansas, have invented certain new and useful Improvements in Shaft-Couplings, of which the following is a specification, reference being had therein to the accompanying drawing.

The object of my invention is to provide a coupling for line shafting which, in its most perfect form, will possess the advantages of facility of application and removal, as few parts as possible, convenience of access to the parts that call for manipulation, and, withal, compactness, and to this end my invention consists in the coupling having the characteristics of construction substantially as hereinafter specified and defined by, or embraced within the scope of, the appended claim.

Figure 1:
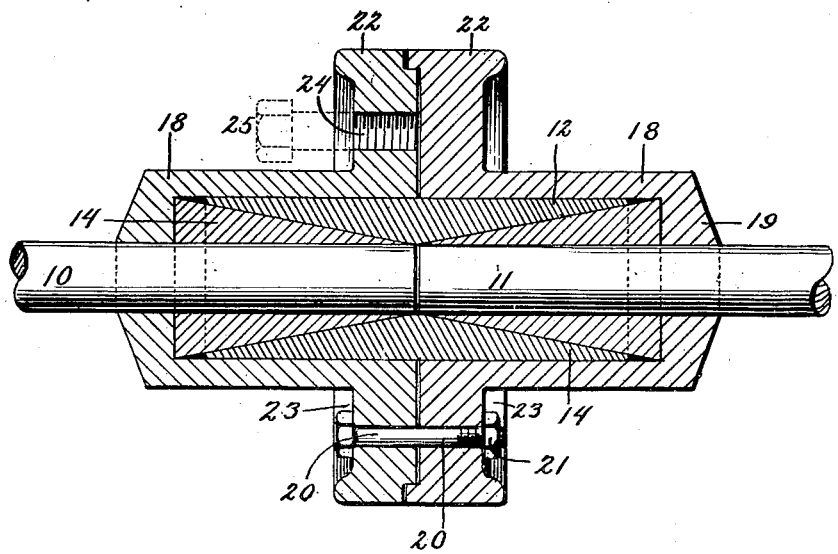
Figure 1 is a longitudinal section of my coupling as applied to the shaft.
Figure 2:
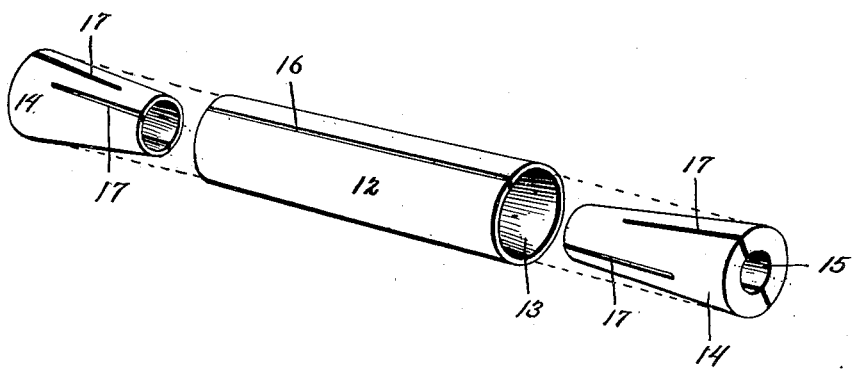
Fig. 2 is a perspective view of the sleeve and plugs, shown separated.

In the drawing, 10 and 11 designate, respectively, the shaft sections to be coupled. Encircling the adjacent end portions of the two shaft sections, is a sleeve 12 whose exterior is cylindrical and of uniform diameter, and its interior, from each end, to, or substantially to, its longitudinal center, is flaring or conical, the taper being inward, and within each conical chamber 13 thus provided is a tapering or conical plug 14 with a cylindrical, shaft-engaging bore 15. The sleeve has a longitudinal split, or slit 16, from end to end, and each plug has several longitudinal slits 17 that reach from each end, inward, a little more than half the length thereof, the slits from opposite ends being out of alinement. Endwise movement of the plugs toward each other expands the sleeve throughout its length, into tight contact with the interior of two encircling shells 18, and compresses the plugs into tight contact with the shaft sections. For producing this endwise movement of the plugs, the shells 18 have inwardly extending flanges 19 that bear, respectively, against the large ends of the plugs, and bolts 20 and nuts 21 connect similar, outwardly extending flanges 22 on the shells, by which both shells are simultaneously moved toward each other, and simultaneously the two plugs are moved toward each other, so that expansion of the sleeve throughout its length takes place. By placing the bolts 20 on the exterior of the shells they are readily accessible; and if desired bolt heads and nuts are situated in a recess 23 in the outer face of each flange so as to avoid any projections apt to catch into objects as the coupling revolves with the shaft.

To effect the separation of the coupling, one or more threaded holes 24 are provided in one of the shell flanges 22, for the reception of a screw or bolt 25 which bearing at its inner end against a solid part of the other shell flange 22, will spread the two shells apart and release the grip. The bolt 25 is placed in a hole 24 only when the coupling is to be released or removed.

While the details of construction shown and described are most excellent, the scope of my invention is not to be limited thereto.

My coupling can be used to connect shafts of different diameters by having the bores of the plugs of appropriate diameter.

I claim:

A shaft coupling comprising two radially contractible shaft-engaging cones placed with their small ends toward each other, a radially expansible sleeve with opposite correspondingly tapered internal surfaces that engage the exteriors of the respective cones, two shells that surround and engage the exterior of the sleeve, the shells having inwardly extending flanges that respectively engage the large ends of the cones, external outwardly extending projections on the respective shells, and bolts extending through holes in such projections that connect them and serve to move the shells toward each other to force the cones toward one another within said sleeve.

In testimony whereof I affix my signature.

ORA O. WALBERT.